March 28, 1933. J. B. WEIR 1,903,153
CLOCK AND MIRROR HOLDER
Filed May 27, 1929
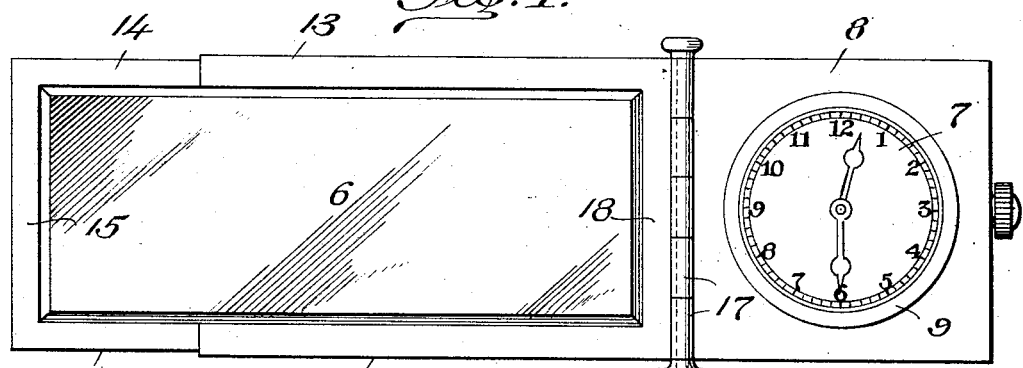
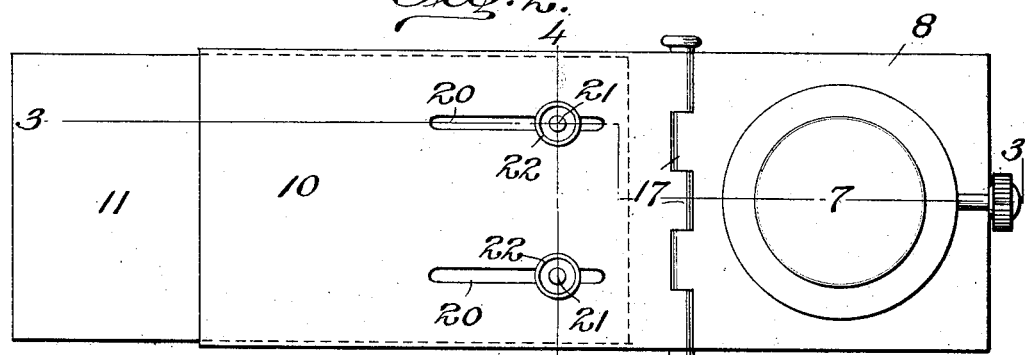
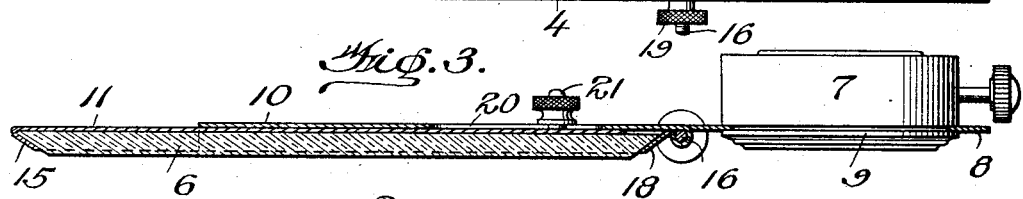
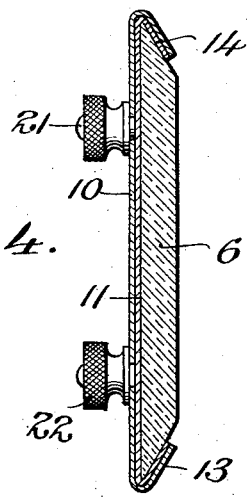
Inventor
James B. Weir
By
Attorney Patented Mar. 28, 1933

1,903,153

UNITED STATES PATENT OFFICE

JAMES B. WEIR, OF NEW DORP, NEW YORK, ASSIGNOR, BY MESNE ASSIGNMENTS, TO STANDARD MIRROR COMPANY, INC., OF BUFFALO, NEW YORK, A CORPORATION OF NEW YORK

CLOCK AND MIRROR HOLDER

Application filed May 27, 1929. Serial No. 366,473.

This invention relates to holders for mirrors and clocks and is especially adapted and intended for use on automobiles, and to provide a single fixture which will hold both a mirror and a clock in such manner that the mirror, as usual, can be set at one angle, and the clock at another, whereby the latter can be seen readily from all parts of the car.

The invention is also intended to avoid the objections incident to mounting the clock in a hole in the mirror, which weakens the latter and often results in cracking.

These results are accomplished by means of a holder made in two parts hinged to each other, and the part which holds the mirror can also be made in sections adjustable to accommodate mirrors of different sizes.

In the drawing, Fig. 1 is a face view of the device. Fig. 2 is a back view thereof. Fig. 3 is a section on the line 3—3 of Fig. 2. Fig. 4 is a section on the line 4—4 of Fig. 2. The mirror is indicated at 6 and the clock at 7. The latter is set in an opening in a leaf or plate 8 and is conveniently held by screwing the bezel 9 on the front end of a threaded neck which projects from the casing through the hole in the plate, whereby the margin of the plate around the opening is clamped between the bezel and the clock case which fits against the back of the plate.

The mirror is held by means of two back plate sections 10 and 11 each of which has bent edges or channels 13 and 14 which telescope or slide in each other, and section 11 has an end channel. The plates 8 and 10 are hinged to each other by means of a pintle 16 extending through ears 17 formed on the respective sections, and the ears on the plate 10 are extended as indicated at 18 to overlie the inner end of the mirror 6 and form a clip for the end. The hinge pin or pintle 16 is threaded to receive a clamping nut 19 by means of which the parts may be tightened, to fix the hinge at adjustment. Also the plate 10 is slotted as indicated at 20 to receive pins 21 which project from the plate 11 through the slots and receive nuts 22 whereby the plates 10 and 11 can be adjusted to proper length or extension to hold the size of mirror desired.

The parts are conveniently made of sheet metal and can be cheaply produced. The mirrir 6 is held under the channels 13—13, 14—14, and 15.

In the use of the device it can be mounted on the bracket ordinarily found on automobiles, for holding a mirror. The mirror will usually be set at one angle, convenient for the driver, and the clock at a different angle, so that it can easily be seen from the rear seat. This is permitted by the hinged connection above described.

Various modifications may be made within the scope of the invention.

I claim:

A panel and instrument holder comprising a back plate made in two sections, each section having inturned flanges at opposite edges to grip a panel, said flanges being slidable one within the other to adjust the length of the plate, and one of the sections being bent over at its ends to form hinge ears, a plate having an opening to receive an instrument, and a hinge pintle connecting the last mentioned plate to said ears, said pintle being provided with a nut to hold the plates at adjustment.

In testimony whereof, I affix my signature.

JAMES B. WEIR.